P. L. CLARK.
LUMINOUS SIGN.
APPLICATION FILED DEC. 3, 1907.
931,036. Patented Aug. 17, 1909.
5 SHEETS—SHEET 1.
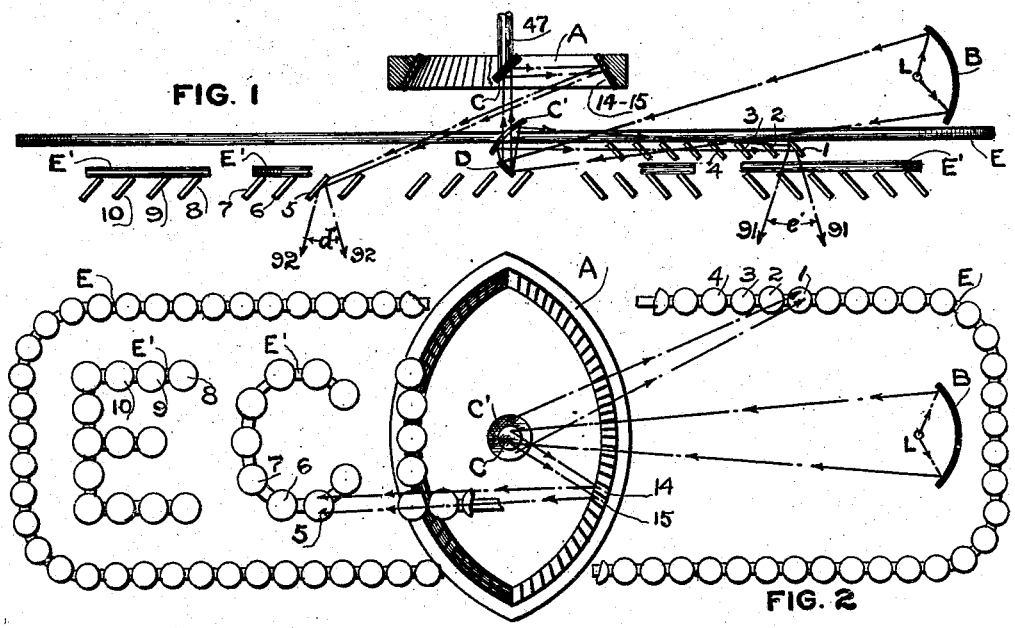
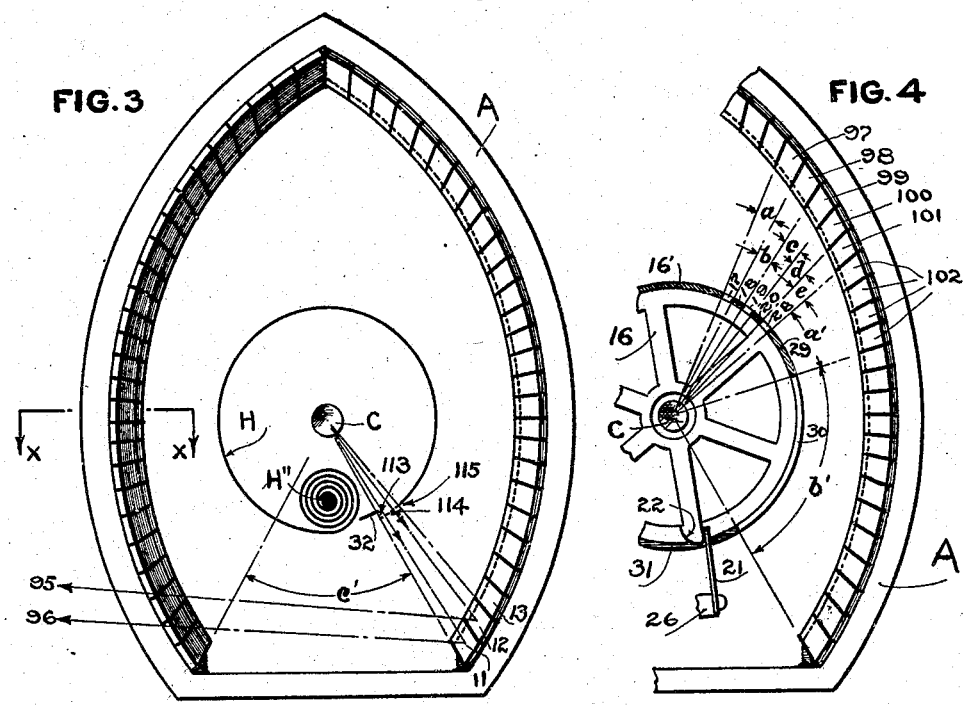
WITNESSES.
INVENTOR.
PAUL L. CLARK
PER
ATTORNEY

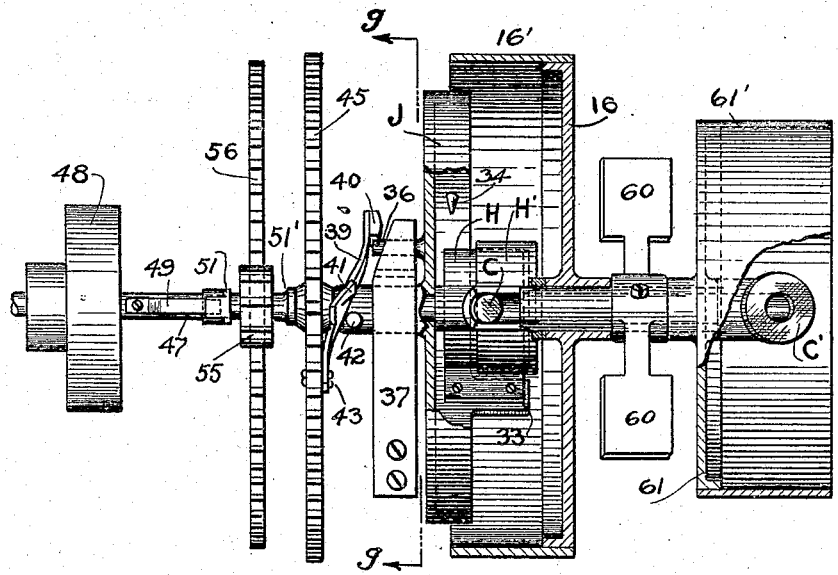
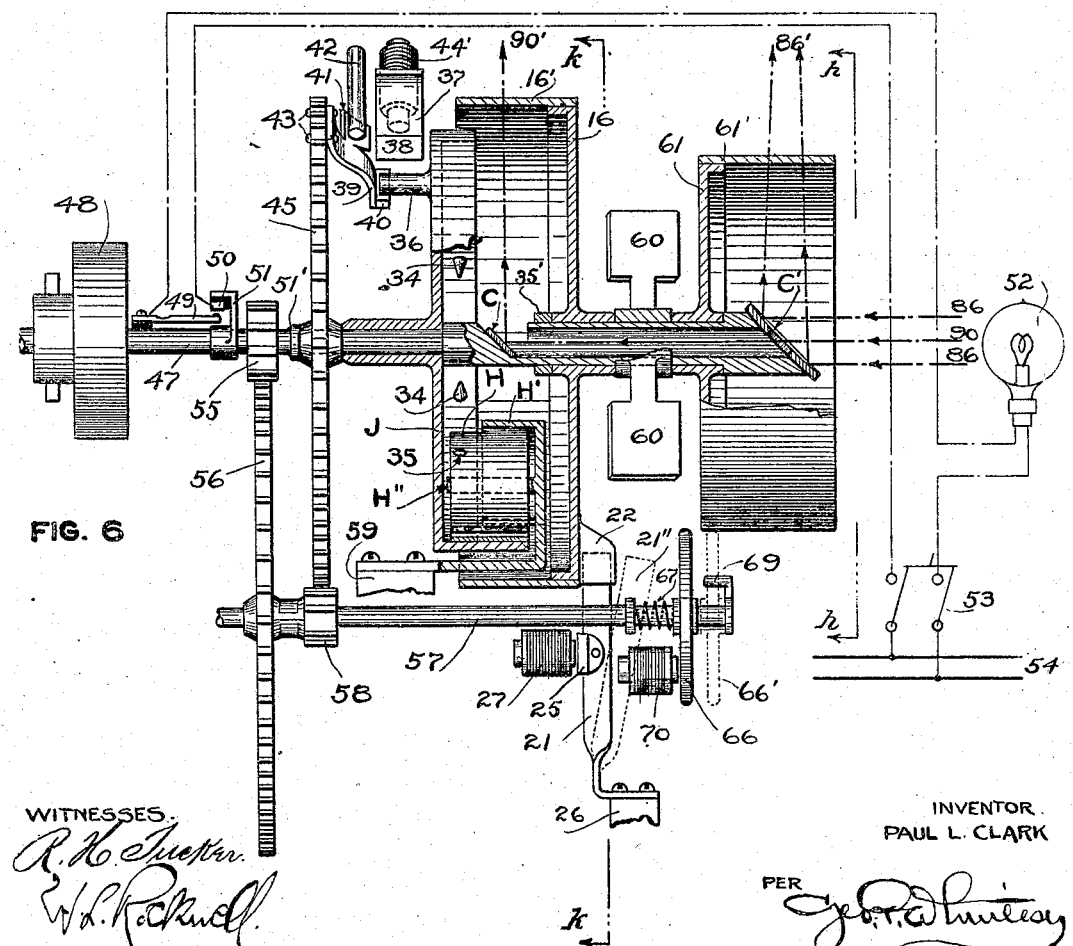

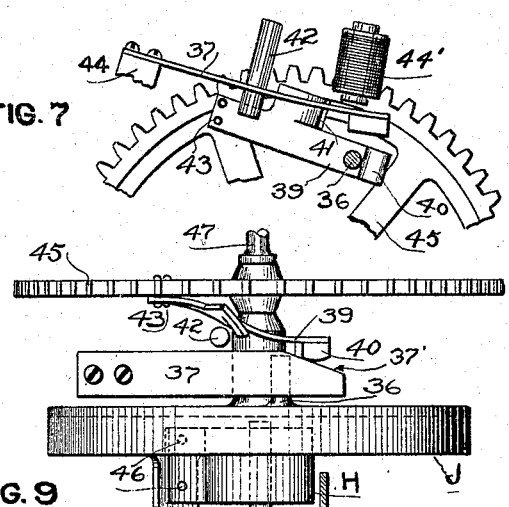
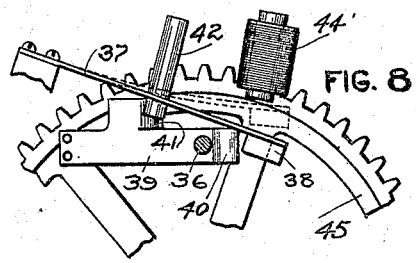
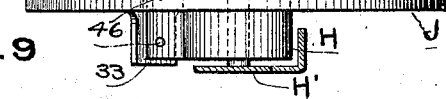
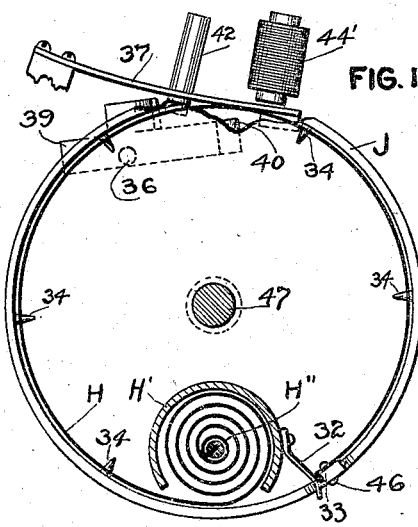
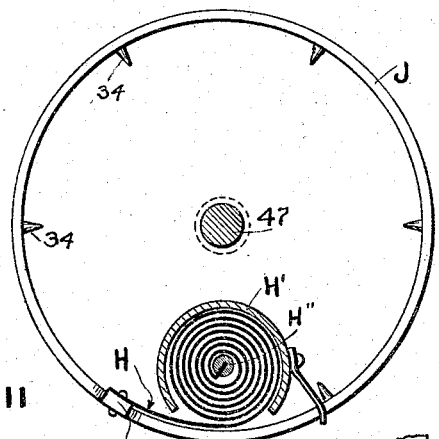
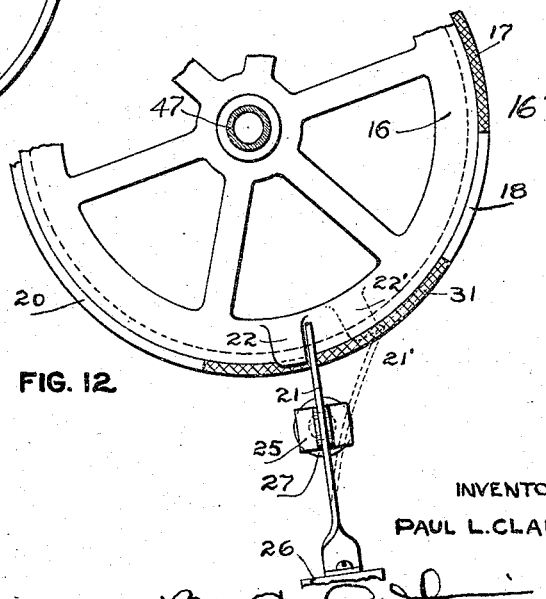

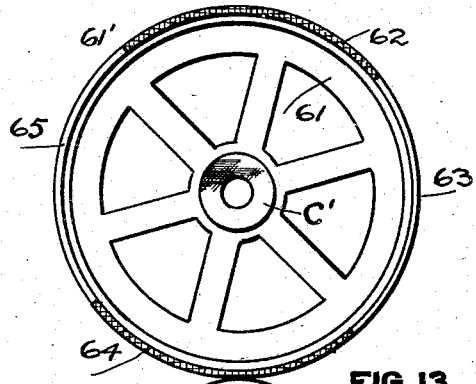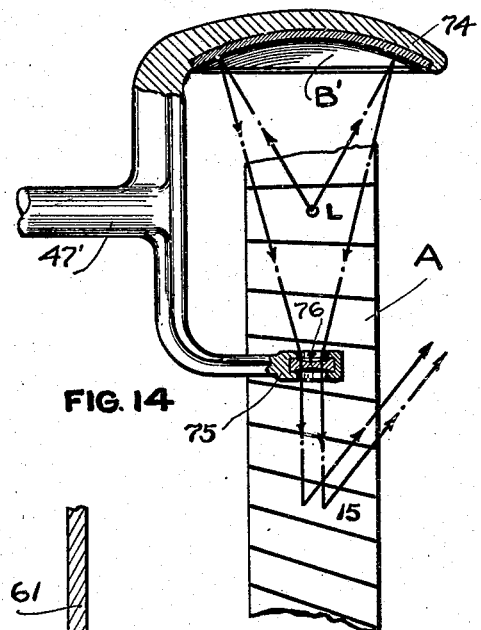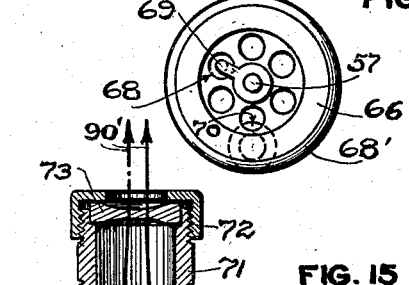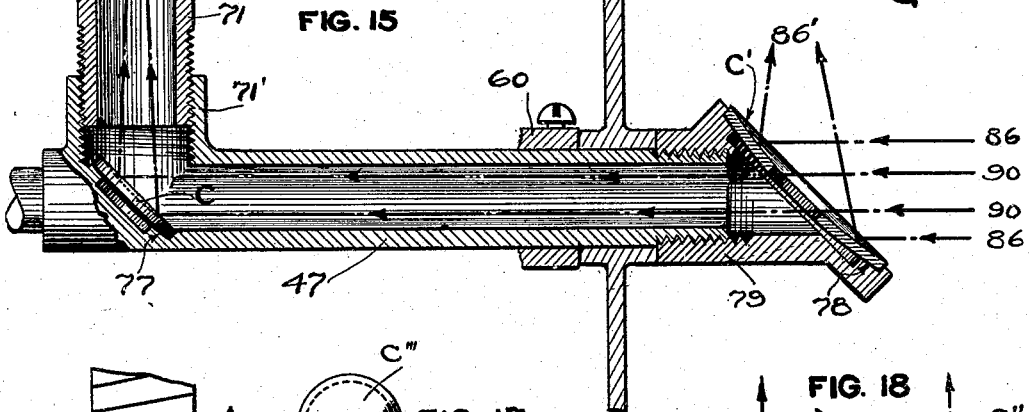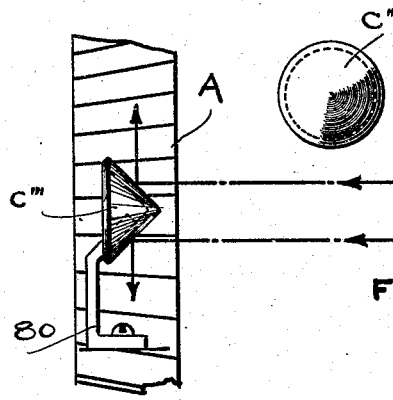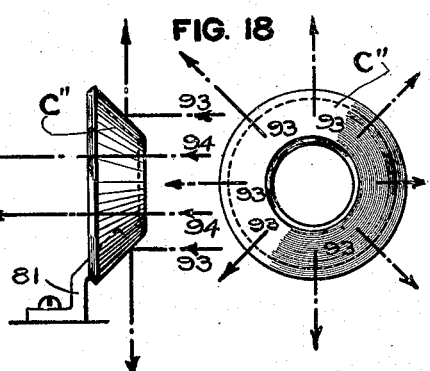

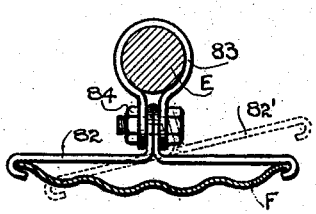
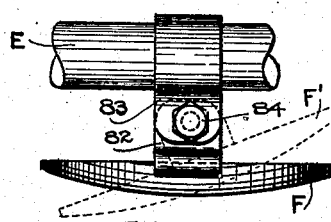
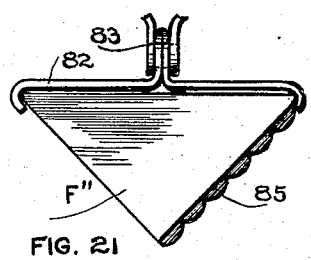
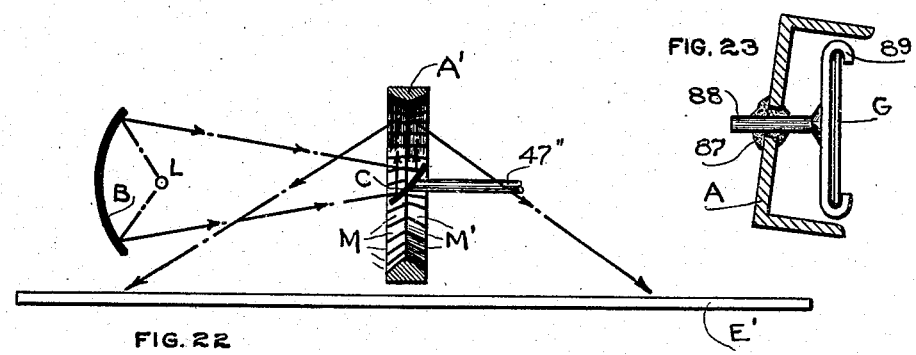
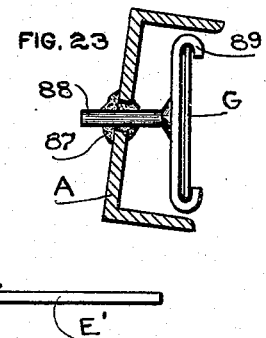

UNITED STATES PATENT OFFICE.

PAUL L. CLARK, OF BALTIMORE, MARYLAND.

LUMINIOUS SIGN.

No. 931,036.　　　　　Specification of Letters Patent.　　　　Patented Aug. 17, 1909.

Application filed December 3, 1907.　Serial No. 404,915.

*To all whom it may concern:*

Be it known that I, PAUL L. CLARK, a citizen of the United States, residing at Baltimore, in the State of Maryland, have invented new and useful Improvements in Luminous Signs, of which the following is a specification.

This invention relates to luminous signs and more particularly to signs having not only illuminated letters, but also an illuminated border encircling the sign.

The object of the invention is to provide a luminous sign capable of a wide degree of flexibility in regard to obtaining light effects of different colors and combinations, and to provide actuating mechanism for the control of the different lighting features, and for effecting changes in the color and intensity of the light upon the sign itself, or upon its border or upon different portions of same.

In addition the object is to diffuse the light from independent and individual light reflecting sections which constitute the outline of the sign or letters, so that the light is distributed through the proper angle and in the most useful direction, and so that the greatest light intensity is in a direction calculated to attract the attention of the largest number of people. I also show several methods for collecting and distributing rays of light from a single source to illuminate the letters and border of a sign.

The illuminating device for the sign and border is adapted to give the following effects: (The lighting effects of sign and border are wholly independent of each other). The following effects may be obtained on the sign itself:—1. All letters illuminated with white light direct from the light source, without any color being shown. 2. All letters with light of any color. 3. Certain letters or different parts of the same letter illuminated with one color and other letters or other parts of the same letter with some other color, or with white light. 4. The tracing of the sign, one point at a time, starting at the beginning of the first letter and lighting each successive point until the whole sign is lighted; and repeating this operation periodically. (The above gives the same effect as writing out the sign and then extinguishing the light). Color effect of sign letters is independent of the "writing" scheme.

The following effects may be obtained in the border of the sign:—1st. White light over entire border. 2nd. Colored light over entire border. 3rd. "Color chasing" or "serpentine effect," *i. e.*, alternate sections of the border are illuminated by different colors, which follow or chase each other around and around the border.

In the drawings: Figure 1 and Fig. 2 show respectively the plan and elevation of the sign, with diagram of direction of path of light and distribution of said light. Fig. 3 is an enlarged view of the light distributing frame, together with a diagram showing the operation of the shutter used for lighting the sign one point at a time. Fig. 4 shows diagrammatically the scheme for simultaneously lighting different parts of the sign with light of different colors. Figs. 5 and 6 are respectively a plan and elevation of mechanism for obtaining the different illumination effects. Figs. 7 and 8 are sections taken at *g—g*, Fig. 5, showing relation of parts of the device at different times. Fig. 9 is a plan view of Fig. 8, except that it shows relation of parts of the device at a later instant than does Fig. 8. Figs. 10 and 11 are elevations of Fig. 9. Fig. 10, however, shows the relation of parts at an earlier instant than does Fig. 11. Fig. 12 shows detail relating to means for obtaining color effect on the sign, and is section taken at K—K, Fig. 6. Fig. 13 shows detail for obtaining color chasing effect and is elevation taken at *h—h*, Fig. 6. Fig. 14 shows a modification of device used for distributing the light for illuminating the sign letters. Fig. 15 is an enlarged view, slightly modified, of detail shown in Figs. 5 and 6, for distributing the light to illuminate the sign and its border. Fig. 16 is an additional modification showing stationary conical mirrors to take the place of revolving mirrors. Figs. 17 and 18 are elevations of the mirrors shown in Fig. 16. Figs. 19 and 20 are section and side view of diffusing reflector, showing methods of attaching to the frame of the sign. Fig. 21 shows a prism substituted for the reflector—showing adaptability of clamp for holding prisms. Fig. 22 is a modification of the sign showing different relative arrangement of parts. Fig. 23 shows enlarged section X—X, Fig. 3. This is a detail of reflectors composing light distributing frame.

In Figs. 1 and 2, B is a reflector for collecting rays of light (shown by dot and dash line) coming from the light source L in the direction of the arrows and reflecting them so as to converge upon the small stationary mirror D which reflects part of the light thrown upon it to the concave mirror C' and the remaining light rays through an opening in the mirror C' to the mirror C. The mirrors C and C' are preferably mounted so as to come respectively in the planes of the light distributing frame A, and the plane of the border. The said mirrors C and C' are both secured to the revolving spindle 47 at an angle of about 45°. The beam of light directed to the mirrors is in the direction along the axis of rotation of the said mirrors. As the spindle 47 revolves it reflects the rays of light from the mirror C so that they fall upon the mirrors such as 14, 15, which are fastened to the inside of the oval frame A. Each of these mirrors controls the direction of the light reflected from it causing the light to fall upon one or more of the light diffusing disks or sections such as 5, 6, 7, uniformly spaced upon the frame-work E' of the sign letters, and adapted to diffuse outwardly through the angle $d'$ the light reflected from them in the direction shown by the arrows on the dot and dash lines 92. The light rays falling upon the concave mirror C' (which is positioned in a plane of the border E as above mentioned) are reflected to converge upon independent light diffusing disks, such as 1, 2, 3 and 4 placed along the border frame-work E. Each of these disks diffuses and distributes the light outwardly through the angle $e'$ and in the direction shown by the arrows on the lines 91. The angles $e'$ and $d'$ are preferably equal. As the spindle 47 with the mirrors C and C' attached to it is rotated, the beams of light reflected from these two mirrors illuminate successive points along, respectively, the outline of the sign letters and the border; and by rotating these mirrors at a speed sufficiently high, the beams of light traverse the whole sign in such short intervals that the sign appears to be continuously and uniformly illuminated.

In Fig. 3, A is the light distributing frame composed of the plane mirrors 11, 12, 13, etc., reflecting the light coming from the mirror C to the sign letter disks (not shown) in the direction of the arrows 95, 96. One end of the spiral clock-spring H is secured to the stationary pin H''. Normally the spring uncoils from around the pin H'', and is restrained by a drum J (shown later in Figs. 5, 6, 9, 10 and 11,) so that it coils completely around the revolving mirror C until its end 113 comes against the stop 32, and acts as a shutter or screen cutting off all the light reflected from the mirror C so that none falls upon the mirrors within the frame A, and consequently the sign letters, which are lighted by the rays reflected from the mirrors composing this light-distributing frame A, remain un-illuminated. Means are provided (shown in Figs. 5, 6, 7, 8 and 9, described later) for slowly re-coiling the spring H about the pin H'' thereby exposing successive mirrors such as 11, 12, 13 to the action of the light from the revolving mirror C. Suppose, as above mentioned, that the spring H is uncoiled about the pin H'', and its end 113 is against the stop 32; now, when the end 113 is moved back to the position 114, the light rays from C are unobstructed and go to the mirror 11 which reflects them in the direction shown by the arrow 96, to the first disk 8, Figs. 1 and 2, of the sign letter E''; by opening to the position shown at 114 the mirror 12 is exposed and the light reflected from 12 goes in the direction of the arrow 95 and illuminates the disk 9 shown in Figs. 1 and 2; the first two disks of the sign are now illuminated. By further opening the spring H the mirror 13 is exposed to the light, and this mirror controls the direction of light to the disk 10, Figs. 1 and 2. In like manner the whole number of mirrors composing the frame A are exposed successively to the light from the rapidly revolving mirror C whose effect is that of a steady source of light. The idea is not that the mirror C is turned slowly first to 11 then to 12 etc., but that by rapidly revolving it (considering the spring H removed) it illuminates all the mirrors in the frame equally, exposing each mirror 11, 12, 13, etc., to the reflected rays from the mirror C for equal periods, and in such rapid succession that although exposed for only a fraction of a second during each revolution of the mirror C, the effect, through the persistence of vision, is as if the light reflected from the mirror C were coming from a steady source. It will be noted that there are no reflectors placed at the bottom of the distributing frame, i. e., the light falling reflected from C through the angle $c'$ is useless as regards lighting the sign. This condition is rendered necessary on account of the location of the clock spring H, which occupies considerable space even when coiled.

In Fig. 4, 16 is a wheel carrying upon its periphery a glass cylinder 16' composed of transparent colored bands, or strips, running parallel to the axis of the wheel. When the wheel is in position shown, light coming from the mirror C passes through the color bands 17, 18, 19, 20, 28, 29 and 30, which may be of any colors but are preferably alternate colors such as red, white, red, white, etc. The bands 17, 18, 19, 20, 28, subtend equal angles $a, b, c, d, e$, from the mirror C and the light through each embraces respectively a single mirror 97, 98, 99, 100 and 101. Consequently, as this group of mirrors controls the light to consecutive disks composing one of the letters of the sign and the light coming from the mirrors is alternately colored and white, it is evident that the disks composing the said letter will be illuminated with light of the same color as the corresponding band on the wheel 16, that is, the disks will be alternately red and white. The color band 29 subtends the angle $a'$ and light passing through this said band 29 embraces the mirrors 102 which direct the light to some given section of a letter or to one or more letters; likewise the color band 30 controls the color of the light passing through it to the mirrors included by the angle $b'$. The band 31 may be of some color not used in illumination above described, and when the wheel 16 is in the position shown with the lug 22 against the stop 21, the said band 31 is idle and serves no purpose. Suppose the stop 21 to be removed and the wheel 16 to revolve at the same angular velocity as the mirror C; then the beam of light is directed continuously through a single color band, as for example, 31, as long as the angular velocities of the mirror C and the said wheel 16 are the same; consequently all the sign letters are illuminated with light of the same color, that is, the color of the band 31. The angular relation of the wheel 16 to the mirror C may be so governed (as later explained) that any of the color bands, such as 17, 18, 19, etc., may be continuously interposed in the path of the rays of light reflected from the said mirror C, thereby illuminating all the sign letters with light of any one color. Of course, I do not limit myself to the proportionate width of the color bands, nor to any special arrangement of the same. Moreover, some of the bands of the wheel may be of clear glass, others may be opaque to shut off all or part of the light from the sign.

In Figs. 5 and 6, 48 is a motor with control (not shown) for variable speed. This motor drives the spindle 47 in a counter-clockwise direction. A centrifugal switch blade 49 is mounted on, and insulated from, the spindle 47 and when the speed of the motor is sufficiently high the blade 49 flies outward and makes contact with the metal piece 50 insulated from the metal piece 51 attached to the spindle 47, thereby closing the circuit through the lamp 52 which furnishes the light for illuminating the sign letters and border, provided the hand operated switch 53, across the source of electrical energy 54 is in a closed position. This centrifugal switch is provided for the purpose of protecting the individual mirrors or disks composing the sign from the effect of the concentrated beam of light with its consequent heat reflected from the mirrors C and C', by making it impossible to have the lamp circuit closed, and consequently to direct any light upon any part of the light distributing frame, when the spindle to which the mirrors C and C' are secured is at rest. In order further to maintain an even and low temperature in the parts exposed to the action of the light or otherwise liable to become heated, I provide fan blades 60 attached to the spindle 47, and adapted to keep up a circulation of air within the apparatus. The pinion 55 is fastened to the spindle 47 and meshes with a larger gear wheel 56 which is fastened to spindle 57 and to the small gear wheel or pinion 58. The larger gear wheel 45 meshes with the said wheel 58 and is mounted upon the spindle 47 with a running fit, restrained from end play by means of the shoulder 51' formed upon the spindle 47. The wheel 45 runs counter-clockwise and is geared down to run at a speed of about 15 or 20 revolutions per minute. A spring 39 having the piece 40 fastened to its end and formed with a slanting, or bent, projection 41, is secured to the rim of the wheel 45 by rivets 43. The said member 39 together with the stationary tripping pin 42 constitutes the detail for closing the clock spring H to allow no light to get to the sign as shown in Fig. 3, and already described. J is a drum mounted upon the spindle 47 with a running fit, and restricted from end play; it has inwardly projecting prongs 34 adapted to engage in holes 35 in the clock spring H, as the said spring is wound upon the inside of said drum J. It will be seen that one end of the spring is fastened to a piece 33 which projects from the drum J. As previously noted in the description of Fig. 3, the tendency of the spring H is to uncoil and in so doing cause the drum J (see also Figs. 10 and 11) to revolve in a clockwise direction, shutting off all light from the distributing frame and consequently from the sign letters. To the drum J is attached a projecting pin 36 adapted to engage the piece 40 on the member 39. Now, the wheel 45 carrying the said member 39 revolves, as has been noted, in a counter-clockwise direction, and each revolution the piece 40 encounters the pin 36, projecting from the spring-impelled drum J, and drags the drum around with it in a counter-clockwise direction opening up a wider and wider arc for the passage of light from the mirror C to the distributing frame A, and forcing the clock spring H back into the guard H' (which is rigidly fastened to the frame 59) into which the said spring is compactly coiled around the stationary pin H''; and this operation continues until the light from C is admitted to the entire distributing frame A; when this condition occurs the bent piece 41 of the member 39 comes in contact with the tripping pin 42, sliding the piece 40 away from the piece 36, and the drum J, (being under tension of the spring H, which at the time of tripping has been forced into the guard H', as shown in Fig. 11) being released from the counter-clockwise pull of the wheel 45, revolves clockwise, and the spring H shuts off all the light from the mirror C to the mirrors in the frame A.

The above described operation of gradually unwinding the spring H from the drum and coiling it within the guard H', then tripping the drum J so that the spring winds up within the said drum J, may of course be repeated indefinitely. (This operation is described further along in reference to Figs. 7, 8, 9 and 10).

The wheel 16 with its color-sectioned glass cylinder 16' has been already partially described in reference to Fig. 4. This wheel is mounted with a running fit upon the tubular end of the spindle 47 and is kept from end play by means of the collar 35' which is fastened to the said spindle 47. At some suitable place on the rim of the said wheel 16, is fixed the projecting piece 22. (See also Fig. 12.) The twisted spring 21 is fastened rigidly to the block 26 and has attached to it the iron piece 25, and normally is held in the position shown, by means of the electro-magnet 27; when in this position, there exists the color band relation previously described in reference to Fig. 4. When, however, the electro-magnet 27 is deënergized, the said spring 21 springs back away from the stop 22 and assumes the position 21'' (shown dotted). The wheel 16 being now free to turn, starts turning in the same direction as the spindle 47, owing to the friction at its bearing surface on the said revolving spindle 47. Naturally, the slip at first is considerable, but the wheel will gradually catch up to the spindle, the length of time required for this performance depending upon the friction between the two bearing surfaces. When the wheel 16 is up to speed the light from the mirror C passes through a single color band and continues to do so as long as the angular velocities of the said mirror C and wheel 16 are equal, as has been previously described for Fig. 4. Suppose there are three colors in the glass cylinder 16' on the wheel 16; then the chance that the wheel will reach synchronism with the desired color in the path of light from C is one in three. So it may take several trials before the wheel is brought to its desired relation with regard to the mirror C. These trials are made by closing and opening the circuit (not shown) of the electro-magnet 27; for it is obvious that each time the stop 22 encounters the spring member 21, it impedes the progress of the wheel 16. The wheel 61 (see also Fig. 13) is very similar to 16, with a glass cylinder 61' on its periphery, divided up into alternate color bands 62, 63, 64, 65, of preferably equal width, designed to color the light passing from the mirror C' to illuminate the border of the sign. Normally, the wheel 61 revolves at the same angular velocity as the spindle 47 upon which it has a running fit, and, when turning at the same speed as the said spindle 47, the border is illuminated with light of any one desired color. If it is desired to give the effect of one stretch of color or chasing the other around and around the border, it is simply necessary to deënergize the electro-magnet 70 by opening its circuit (not shown), thereby releasing the spring-impelled iron wheel 66, having a rim 68' (see Fig. 13) of frictional material; the said wheel slides along the spindle 57 under the tension of the spring 67, to the position 66' (shown dotted) the inwardly projecting pin 69 engaging the said wheel 66 by entering one of the holes 68 in the web of the wheel. In this position the wheel 66 is locked to the spindle 57 and the frictional surface 68' comes against the periphery of the glass color cylinder 61', causing it to revolve at the same peripheral speed as the said wheel 66. As this color wheel revolves counter-clockwise the color bands projected upon the border follow each other around in the same direction and at the same angular velocity as that of the color wheel 61'. When it is desired to change back to border illumination in one color, it is necessary only to energize the electro-magnet 70, which attracts the iron wheel 66 so that the turning of the wheel 61 is influenced only by the friction of its bearing surface on the spindle 47; the wheel 61 accelerates its speed until its inertia is wholly overcome by the friction of its bearing surface; and when this condition is reached the color cylinder revolves at the same angular speed as the spindle 47, effecting the border illumination in a single color as already described. The mirrors C and C' are securely fastened to the spindle 47, as explained in the description of Figs. 1 and 2. The spindle 47, as will be noted from the drawings, is tubular to allow the rays of light coming from 90 to pass through the aperture in the mirror C' to the mirror C. From C, the light is reflected outwardly as shown by the direction of the arrow 90' to the mirrors within the light distributing frame A, as described in reference to Figs. 1 and 2. The rays 86 going to the concave mirror C' are reflected to the border segments, as likewise described for Figs. 1 and 2.

Fig. 7 shows the relation of different parts of the tripping device for the clock-spring H, shown in Figs. 10 and 11; it will be noticed that the spring member 37 is held up by the electro-magnet 44' from the pin 36 attached to the drum J, Figs. 10 and 11, so that the tripping of the member composed of the said spring H and drum J, occurs when the projecting piece 41 of the member 39 hits the stationary pin 42, as has been described in reference to Figs. 5 and 6.

Fig. 8 shows the relation of the tripping parts just before tripping, and with the electro-magnet 44' deënergized. The spring member 37 drops downward, the piece 38 attached to it coming in the path of the pin 36 which, after the operation of tripping, flies backward, or clock-wise, and stops when it hits the said piece 38. In this manner the drum J is held open against the tension of the spring H, which is forced within the guard H', as shown in Fig. 11, allowing light to be transmitted to every mirror in the frame A, as described in connection with Fig. 3; and obviously, this condition exists as long as the locking member 37 is down and restrains the spring H from coiling around the mirror C.

In Fig. 9, the locking member 37 is shown holding the spring H coiled within the guard H'. When the said locking member 37 is down (as shown) over the pin 36, its edge projects over the end of the said pin, and as the slowly revolving wheel 45 turns counter-clockwise carrying with it the member 39, the piece 40 (which normally would engage the pin 36) encounters the face 37' and is deflected over the end of said projecting pin 36, independent of the tripping pin 42.

In Fig. 10, the member consisting of the clock-spring H and the drum J, is shown the instant after it has been tripped and in its normal position with the said spring H wrapped around the inside of the drum J and retained in position by means of the prongs 34 which pass through holes in the edge of the said spring. A resilient stop 32 is riveted to the guard H', and takes the shock when the stop 33 on the drum J strikes against it after the tripping operation. As the member 39 advances counter clock-wise, the piece 40 picks up the pin 36 attached to the drum J, and gradually widens the arc for the passage of light directed toward the distributing mirrors in the frame A, as fully described for Fig. 3.

Fig. 11 is a front elevation of Fig. 9, showing method of attaching the ends of the clock-spring H to the stationary pin H" and to the projecting piece 33 on the drum J.

In Fig. 12, 47 is the tubular end of the spindle, upon which is mounted with a running fit (as previously stated in the description of Figs. 5 and 6) the wheel 16 with the colored glass cylinder 16' having colored sections 17, 18, etc., controlling the color of the light to the different parts of the sign letters. The dotted positions 22' and 21' show, respectively, the positions of the lug 22 and the spring member 21 after the impact of the said lug and spring. It is obvious that if the momentum of the revolving wheel 16 is great enough, it will not come to a stop the first time it hits the spring 21, but will be gradually retarded until it does come to rest at the desired place, when the conditions described in reference to Fig. 4 hold true.

Fig. 13 has already been gone over with reference to the description of Figs. 5 and 6.

In Fig. 14, 47' is a spindle designed to be revolved rapidly. Attached to this spindle on one side is the hood 74 in which is set the reflector B', adapted to focus rays of light coming from the light source L, located on the axis of the said spindle 47', upon the lens 76 fastened in the end of the arm 75. The said lens 76 parallels the light rays coming to it from the reflector B', and transmits them to the mirror 15 in the frame A, and this mirror reflects them to illuminate some disk on the sign letter. As the spindle 47 is rapidly turned, the parallel rays of light leaving the lens 76 strike all the mirrors in the frame A in rapid succession, thus illuminating the sign letters, as explained in reference to Figs. 1 and 2. It is, of course, understood that the light L is stationary, the spindle 47' simply rotating the reflector B' and the lens 76 around it. The light L being at a fixed distance from the reflector B', and the lens 76 also being fixed with relation to the said reflector B', the rays of light are always focused upon the lens 76, and paralleled by this lens, regardless of the angular position of the spindle 47'. The light rays shown passing through the lens 76 may, of course, be used equally well for border illumination.

In Fig. 15 is shown the tubular end of the spindle 47, as described in reference to Figs. 5 and 6. The concave mirror C' has an opening for the passage of the light rays 90 coming in the direction shown by the arrows. This mirror is backed against, and secured to, a seat 78 formed in the cap piece 79 screwed on the end of the tubular spindle 47, and is set preferably making an angle of about 45° with the axis of the said spindle, as pointed out in Figs. 1 and 2. The rays of light 86 are converged to fall upon the border disks. The rays 90 pass through the tube 47 to the mirror C, also set at an angle of 45° and fastened in the seat 77. It is well known that light rays coming from any light source, however small, cannot be focused upon a single point, even with the most accurate and precise reflectors or lenses, owing to the fact that said luminous body is not a point, but radiates light from points over its entire surface; consequently, there is a certain divergence in rays eminating from a given light source when reflected from a single point on a reflector, this angle of divergence being equal to the angle formed between the rays of light coming from opposite sides of the source of light, and striking the reflector at the point in question.

Therefore the impracticability of trying to concentrate upon a single point rays from any known source of light or to parallel all rays, or even a greater portion of the rays, is apparent. I have, however, devised means to break up the diverging beam of light into two or more beams of less divergence than the original beam. For it is obvious that if the diverging beam be halved laterally through its axis, that is, the angle of divergence be bisected the divergence of each half angle is half that of the original angle. I treat the light rays in each half angle, separately, reflecting the rays in one half to illuminate the border,—those in the other half to illuminate the sign letters. The above explains the reason for having the mirrors C and C' arranged concentrically. The mirror C catches the rays within the inner cone of divergence and C' catches the overflow or outer rays which diverge to a greater extent. The curvature of C' is, as has been remarked, such that the reflected rays 86' converge toward the sign border. The curvature of the mirror C is such that in reflecting the rays of light 90, it converges them to fall upon the lens 73, which parallels and transmits them to the mirrors in the frame A. The lens 73 is secured in position by means of the screw cap 72 on the pipe 71. The pipe is screwed into an elbow 71' formed on the tubular end of the spindle 47. The screw connection between 71 and 71' enables the proper adjustment to be made for focusing the light rays 90'.

In Fig. 16, A is the usual light distributing frame. C''' is a conical mirror secured by the support 80, rigidly in position, preferably in the plane of the frame A, and adapted to reflect radially the light rays 94, continuously and uniformly to the mirrors composing the frame A. C'' is a mirror the shape of the frustum of a cone, and adapted to reflect light rays 93, radially to illuminate the disks on the border outline.

Fig. 17 is a front view of the mirror C''', which it is seen is circular in form.

Fig. 18 is a front view of the mirror C'' and shows the scheme for the reflection of all rays coming against its surface. These rays 93, as is noted, are reflected radially. The aperture in C'' is for the purpose of allowing the light rays to pass through its center to the mirror C'''.

In Figs. 19 and 20, E is the iron frame supporting the disks which form the letters or border of the sign. As is noted, this iron is round in section. The corrugated light diffuser F is circular in shape and made preferably of enameled metal, adapted to be clamped between the jaws of the member 82. The metal piece 83 fits over the iron frame E and laps over the offset in the member 82. The parts are so proportioned that by tightening the bolt 84, the diffuser F is securely held at any desired angle. The entire holder may be turned around the iron frame piece E by loosening the bolt 84, as shown by the dotted position 82'. Adjustment for reflecting the light rays in the desired direction may be made by turning the member 82 about the bolt 84 as shown by dotted position F'. Also the circular diffuser F may be revolved to set at any angle within the jaws of the member 82. The diffusers F shown here are the same as those shown in 1 to 10, inclusive, Figs. 1 and 2.

In Fig. 21, the members 82, 83, are the same as shown in Figs. 19 and 20. The prism F'' having a corrugated face 85 is securely held in position by the jaws of the member 82.

In Fig. 22, B is the usual concave reflector, collecting and directing the light rays from L to the small concave reflector C, mounted on the revolving spindle 47'', at an angle of 45°. The frame A' is set at right angles to the sign E' and a double row of mirrors M, M' controls the direction of light to the sign E', the mirrors M' reflecting their light to the right, while the mirrors M direct the light coming to them to the left of the sign.

In Fig. 23, G is a mirror, such as 11, 12, 13, 14, 15, shown in Figs. 2 and 3, held in the jaws of a metal piece 89, which in turn is fastened to the projecting pin 88 going through a hole in the frame A. After properly adjusting the mirror G to reflect its incident rays of light so that they fall upon some desired disk on the sign outline, the mirror is held rigidly in position by solder or cement 87 placed about the opening in A where the pin 88 comes through.

Having thus described my invention, what I claim is:

1. An illuminated sign comprising a plurality of reflectors grouped in predetermined arrangement, a source of light, and means for directing the light rays from said source to said reflectors in rapid succession.

2. An illuminated sign comprising a plurality of reflectors arranged in predetermined manner, a source of light, stationary mirrors adapted to reflect light to all of said reflectors, and means for causing the light rays from said source to traverse said stationary mirrors rapidly.

3. An illuminated sign comprising a plurality of reflectors arranged in a predetermined manner, a source of light, stationary mirrors adapted to reflect light to said reflectors, and a rotatable mirror for causing light rays to traverse said stationary mirrors rapidly.

4. An illuminated sign comprising two sets of reflectors arranged in a predetermined manner in two parallel planes, a source of light, two rotating mirrors one of which is adapted to reflect light rays to one of said sets of reflectors, and stationary mirrors for deflecting the rays from the other of said rotating mirrors to the other of said sets of reflectors.

5. An illuminated sign comprising sets of reflectors arranged in a predetermined manner in different parallel planes, a single source of light, a plurality of rotatable mirrors, arranged in the small axial line, the one nearer the source of light being perforated to permit light to pass to one farther away from said source, means for rotating said mirrors and means for directing the light reflected from each to its respective set of reflectors.

6. An illuminated sign comprising a plurality of reflectors, a source of light, means for causing light rays to traverse said reflectors rapidly in succession, and means for intercepting said rays.

7. An illuminated sign comprising a plurality of reflectors, a source of light, means for causing light rays to traverse said reflectors rapidly, and means for gradually exposing said reflectors to said rays in a predetermined manner.

8. An illuminated sign comprising a plurality of reflectors, some facing in one direction and some in the opposite direction, a curved group of mirrors adapted to reflect light rays to said reflectors, a rotatable mirror concentric with said curved group of mirrors and adapted to reflect light rays thereto, and a source of light furnishing light rays to said rotatable mirror.

9. An illuminated sign comprising a plurality of reflectors arranged in different planes, a group of mirrors in the rear of said reflectors and composed of two curved parts adapted to reflect light rays to all the reflectors in one plane, a rotatable shaft concentric with said curved group of mirrors, two oblique mirrors carried by said shaft, one coöperating with the curved group of mirrors and the other with the reflectors in the second plane, and a source of light furnishing light rays to both oblique mirrors.

10. An illuminated sign comprising a plurality of reflectors, a curved group of mirrors adapted to reflect light to some of said reflectors, a tubular shaft concentric with said group of mirrors and having a lateral opening, an oblique mirror in said shaft opposite said opening, and an annular oblique mirror on the end of said shaft.

11. An illuminated sign comprising a plurality of reflectors, a curved group of mirrors adapted to reflect light to said reflectors, a rotatable oblique mirror concentric with said group of mirrors, and a rotatable shutter concentric with said oblique mirror.

12. An illuminated sign comprising a plurality of reflectors, a curved group of mirrors adapted to reflect light to said reflectors, a rotatable oblique mirror concentric with said curved group of mirrors, and a rotatable shutter concentric with said oblique mirror, means for continuously rotating said oblique mirror, and means for causing said shutter to oscillate around said mirror.

13. An illuminated sign comprising a plurality of reflectors, a group of mirrors adapted to reflect light to said reflectors, a rotatable oblique mirror concentric with said group of mirrors, means for continuously rotating said oblique mirror, a spiral spring coiled on an axis eccentric to said mirror and normally surrounding the same, means for carrying one end of said spring around said mirror to expose the same, and means for releasing said spring to permit it to re-encircle said mirror.

14. An illuminated sign, comprising a plurality of reflectors, a group of mirrors for reflecting light thereto, a rotatable oblique mirror concentric with said group of mirrors, and a rotatable color screen concentric with said oblique mirror.

15. An illuminated sign, comprising a plurality of reflectors, a curved group of mirrors for reflecting light thereto, a rotatable oblique mirror concentric with said group of mirrors, and a rotatable color screen concentric with said oblique mirror, and means for arresting the rotation of said screen at will.

16. An illuminated sign, comprising a plurality of reflectors, a group of mirrors for reflecting light thereto, a rotatable oblique mirror concentric with said group, and a rotatable cylindrical color screen concentric with said oblique mirror, and means for rotating said screen at a slower rate than the oblique mirror.

17. An illuminated sign comprising a rotatable tubular shaft, oblique mirrors carried thereby, an electric light in line with said mirrors, and a centrifugal switch on said shaft controlling said light.

18. An illuminated sign comprising a plurality of reflectors, a source of light, means for concentrating light rays into a beam, and means for laterally dividing said beam into separate beams for illuminating said reflectors.

19. An illuminated sign comprising a plurality of reflectors, a source of light, and means for gradually exposing said reflectors to rays from said light source in a predetermined manner.

In testimony whereof I have signed my name to this specification in the presence of two subscribing witnesses.

PAUL L. CLARK.

Witnesses:
A. A. HUTCHINSON,
G. H. LEAVERTON.